US012661635B1

(12) United States Patent

Napolitano

(10) Patent No.: US 12,661,635 B1

(45) Date of Patent: Jun. 23, 2026

(54) ENVIRONMENTAL CONTROL DEVICE AND A METHOD OF REMOVING CHEMICAL SPECIES FROM AN ENCLOSED SPACE

(71) Applicant: Michael A. Napolitano, Mashpee, MA (US)

(72) Inventor: Michael A. Napolitano, Mashpee, MA (US)

( * ) Notice: Subject to any disclaimer, the term of this patent is extended or adjusted under 35 U.S.C. 154(b) by 0 days.

(21) Appl. No.: 19/089,865

(22) Filed: Mar. 25, 2025

Related U.S. Application Data

(60) Provisional application No. 63/570,276, filed on Mar. 27, 2024.

(51) Int. Cl.

| | |
|---|---|
| *B01J 20/28* | (2006.01) |
| *B01D 53/02* | (2006.01) |
| *B01D 53/46* | (2006.01) |
| *B01J 20/02* | (2006.01) |
| *B01J 20/04* | (2006.01) |
| *B01J 20/18* | (2006.01) |
| *B65D 81/26* | (2006.01) |

(52) U.S. Cl.

CPC ........ *B01J 20/28045* (2013.01); *B01D 53/02* (2013.01); *B01D 53/46* (2013.01); *B01J 20/0229* (2013.01); *B01J 20/046* (2013.01); *B01J 20/18* (2013.01); *B01J 20/28035* (2013.01); *B65D 81/266* (2013.01); *B01D 2253/1122* (2013.01); *B01D 2253/116* (2013.01); *B01D 2257/104* (2013.01); *B01D 2257/7022* (2013.01); *B01D 2257/80* (2013.01); *B01D 2258/06* (2013.01)

(58) Field of Classification Search

CPC ...................... B01J 20/28045; B01J 20/0229; B01J 20/046; B01J 20/18; B01J 20/28035; B01D 53/02; B01D 53/46; B01D 2253/1122; B01D 2253/116; B01D 2257/104; B01D 2257/7022; B01D 2257/80; B01D 2258/06; B65D 81/266

See application file for complete search history.

(56) References Cited

U.S. PATENT DOCUMENTS

| 4,332,845 A | * | 6/1982 | Nawata | ................ | B65D 81/268 |
| | | | | | 428/137 |
| 4,512,897 A | * | 4/1985 | Crowder, III | .......... | G01N 30/56 |
| | | | | | 96/101 |

(Continued)

*Primary Examiner* — Dung H Bui

(74) *Attorney, Agent, or Firm* — John Rizvi; John Rizvi, P.A.—The Patent Professor®

(57) ABSTRACT

There is provided an environmental control device that increases one or more chemical species removal from an enclosed space. The environmental control device comprises a series of longitudinal cells that are arranged in a honeycomb formation, each having a first material positioned in a lower part and a second material positioned in an upper part of each cell. The longitudinal cells are angled by their bases on a support structure, and thus, when the environmental control device is turned vertically and hung, the angling of the longitudinal cells is directed in an upward direction from a ground. This upward angling of the cells prevents the one or more chemical species that accumulate in each of the cells from contacting a water-vapor transmissible, liquid water-impermeable material that overlays the top of the longitudinal cells.

14 Claims, 7 Drawing Sheets

(56)  References Cited

U.S. PATENT DOCUMENTS

| | | | | |
|---|---|---|---|---|
| 5,907,908 A * | 6/1999 | Cunanan | B01D 53/263 | |
| | | | 34/80 | |
| 6,217,701 B1 | 4/2001 | Shelley et al. | | |
| 6,662,950 B1 | 12/2003 | Cleaver | | |
| 7,465,314 B2 * | 12/2008 | Kiblawi | F25B 43/003 | |
| | | | 220/795 | |
| 9,738,520 B2 | 8/2017 | Fujita et al. | | |
| 10,300,163 B2 | 5/2019 | Bogle | | |
| 10,960,341 B2 * | 3/2021 | Wendland | B01D 39/1623 | |
| 11,000,827 B2 * | 5/2021 | Maanum | B01J 20/2805 | |
| 11,883,793 B2 * | 1/2024 | Ellebracht | B01J 20/28011 | |
| 2002/0068149 A1 * | 6/2002 | Koyama | C04B 35/63416 | |
| | | | 428/137 | |
| 2006/0039841 A1 * | 2/2006 | Rico | A61L 2/186 | |
| | | | 422/305 | |
| 2006/0144733 A1 | 7/2006 | Wu et al. | | |
| 2007/0227351 A1 * | 10/2007 | Garcia-Martinez | B01J 29/40 | |
| | | | 210/660 | |
| 2008/0105613 A1 * | 5/2008 | Ichikawa | B01D 71/021 | |
| | | | 210/500.26 | |
| 2012/0015081 A1 * | 1/2012 | Crump | B65D 81/267 | |
| | | | 426/106 | |
| 2012/0204725 A1 * | 8/2012 | Goelet | B01D 53/06 | |
| | | | 96/143 | |
| 2013/0113126 A1 * | 5/2013 | Mockry | F28F 25/08 | |
| | | | 165/104.34 | |
| 2014/0339105 A1 * | 11/2014 | Czarny | B65D 75/366 | |
| | | | 206/204 | |
| 2015/0258487 A1 * | 9/2015 | Hornbostel | B01J 20/3268 | |
| | | | 428/305.5 | |
| 2016/0332107 A1 * | 11/2016 | Iftkhar | B01D 53/0407 | |
| 2019/0143658 A1 * | 5/2019 | Inoue | B32B 27/08 | |
| | | | 428/36.7 | |
| 2019/0209962 A1 * | 7/2019 | Meirav | B01D 24/10 | |
| 2020/0179903 A1 * | 6/2020 | Beiermann | B01J 20/22 | |
| 2021/0260562 A1 * | 8/2021 | Shaikh | B01J 20/28076 | |
| 2021/0276784 A1 | 9/2021 | Erickson | | |
| 2021/0322609 A1 | 10/2021 | Bohnert et al. | | |
| 2022/0152541 A1 * | 5/2022 | Lewis | F24F 8/80 | |
| 2022/0176345 A1 * | 6/2022 | Bootland | B01J 20/18 | |
| 2022/0339471 A1 * | 10/2022 | Lee | B01D 39/06 | |
| 2022/0370937 A1 * | 11/2022 | Choi | B01D 39/2068 | |
| 2022/0416568 A1 * | 12/2022 | Mindte | H02J 3/0012 | |
| 2023/0028077 A1 * | 1/2023 | Vilarrasa Llorens | | |
| | | | B01D 53/8687 | |
| 2023/0142973 A1 * | 5/2023 | Gamache | A61L 9/22 | |
| | | | 128/204.17 | |
| 2023/0202736 A1 * | 6/2023 | Wong | B01D 53/0407 | |
| | | | 206/204 | |
| 2023/0277989 A1 * | 9/2023 | Noda | B01J 20/3204 | |
| | | | 210/500.25 | |
| 2023/0330603 A1 * | 10/2023 | Miyahara | B01J 20/28004 | |
| 2023/0337703 A1 * | 10/2023 | Pratt | B01J 20/2805 | |
| 2023/0338900 A1 * | 10/2023 | Miyahara | B01J 20/28035 | |
| 2023/0347314 A1 * | 11/2023 | Fossum | B01J 20/12 | |
| 2024/0042089 A1 * | 2/2024 | Ham | B01D 46/2486 | |
| 2024/0240816 A1 * | 7/2024 | Eplee | B01D 53/185 | |
| 2026/0034536 A1 * | 2/2026 | Kang | B01J 35/56 | |

* cited by examiner

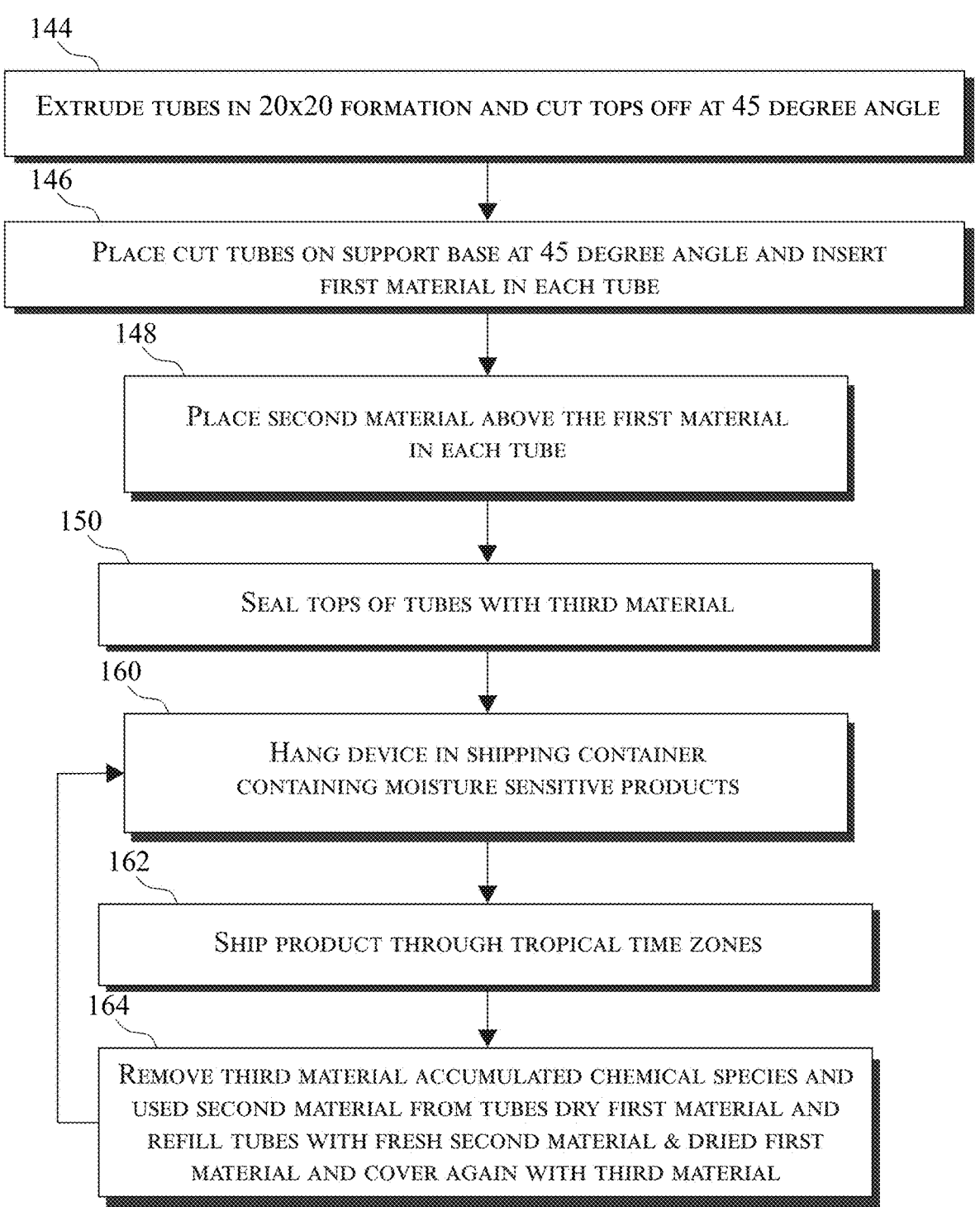

144
EXTRUDE TUBES IN 20x20 FORMATION AND CUT TOPS OFF AT 45 DEGREE ANGLE

146
PLACE CUT TUBES ON SUPPORT BASE AT 45 DEGREE ANGLE AND INSERT FIRST MATERIAL IN EACH TUBE

148
PLACE SECOND MATERIAL ABOVE THE FIRST MATERIAL IN EACH TUBE

150
SEAL TOPS OF TUBES WITH THIRD MATERIAL

160
HANG DEVICE IN SHIPPING CONTAINER CONTAINING MOISTURE SENSITIVE PRODUCTS

162
SHIP PRODUCT THROUGH TROPICAL TIME ZONES

164
REMOVE THIRD MATERIAL ACCUMULATED CHEMICAL SPECIES AND USED SECOND MATERIAL FROM TUBES DRY FIRST MATERIAL AND REFILL TUBES WITH FRESH SECOND MATERIAL & DRIED FIRST MATERIAL AND COVER AGAIN WITH THIRD MATERIAL

FIG. 6

ENVIRONMENTAL CONTROL DEVICE AND A METHOD OF REMOVING CHEMICAL SPECIES FROM AN ENCLOSED SPACE

CROSS-REFERENCE TO RELATED APPLICATION

This application claims the benefit of U.S. Provisional Patent Application Ser. No. 63/570,276 filed on Mar. 27, 2024, which is incorporated by reference herein in its entirety.

FIELD OF THE INVENTION

The present invention relates generally to the field of environmental control agents such as desiccants, oxygen absorbers, and ethylene absorbers that are designed to absorb one or more chemical species, such as moisture, oxygen, and ethylene, in enclosed spaces. More particularly, the present invention relates generally to hung containers, which are used with packaged goods that are prone to damage due to prolonged exposure to excessive moisture, oxygen, and ethylene.

BACKGROUND OF THE INVENTION

Desiccant devices are used very frequently in the storage and/or packaging of goods which can be damaged from mold, bacteria and the like which arises from exposing the goods to excessive moisture for a prolonged period of time.

Some non-limiting examples of goods which are often shipped prolonged distances are foodstuffs, e.g., coffee, beans, and peanuts. These food stuff goods are usually loaded at their original shipping location port in good marketable condition. However, during the passage of most container cargo ships through various regions of the world, e.g., the tropics, the containers in cargo ships undergo an extremely large divergence in temperature and humidity. The variable temperature and humidity, particularly during longer periods of transportation, may lead to condensation on the goods (i.e., "cargo sweat") or internal surfaces of the container (i.e., "container rain"). In turn, this condensation may lead to microbial and/or water damage of the goods. More specifically, these dramatic variances can result in contamination by microbes (e.g., bacteria, molds, and fungi) and may lead to damage in the form of stains, discoloration, rot, and/or microbial spoilage. Such damage can often be accompanied by malodors (e.g., mustiness). Moreover, microbial and/or water damage may also lead to insect infestation and associated damage.

The loss of marketable goods, and the costs associated with microbial and/or water damage to shipped goods can be considerable. Since the parties shipping the product in the shipping container/ship are often the ones who carry the risk of the quality of the product, and not the recipient, such parties are inclined to try and avoid as much of the aforementioned types of damage so as to secure the best price at their port of delivery from the recipient. However, even though a tightly closed shipping container provides excellent protection of the goods from the effects of rain, snow, salt spray, dust, excessive heat, and ultraviolet light, providing adequate protection against microbial and/or water damage can be a great challenge as shipping containers can be exposed to considerable climatic variation.

Conventionally, as a proposed solution there have been two different types of desiccant devices which are used in prolonged storage and/or shipping of goods. Both of these devices use varied kinds of desiccant material therein, but the devices vary in terms of their construction. The first kind of desiccant device is a hanging bag type desiccant device. Such a device consists of a single compartment made of water-vapor permeable, liquid water-impermeable plastic material, such as the limiting example of Tyvek®, which is a synthetic material made of high density spun bound polyethylene fibers. The bag of such material contains desiccant material therein. Water vapor from the environment can be drawn through the bag material by the desiccant and can condense in the bag into liquid water. Such liquid water cannot usually pass through the bag material and thus can be retained in the bag.

The hanging bag-type desiccant device has inherent problems. First, many desiccant materials such as calcium chloride increases their water absorption as a function of temperature. Second many water-vapor permeable, liquid water-impermeable materials such as Tyvek® decrease their liquid water impermeability as a function of pressure.

The ambient air inside a shipping container can reach temperatures as high as 120 degrees Fahrenheit. Such high temperatures increase water absorption to four times the weight of the desiccant and increases pressure on the plastic containing material as a function of the increased water weight. The combination of both may' cause the plastic containing material to allow water to leak onto foodstuff in the shipping container resulting in the aforementioned mold and damage to the product.

In an attempt to address this issue, most bag type desiccant devices employ a gelling agent mixed into the desiccant. The gelling agent turns the water into a gel so that it blocks water from passing through the plastic bag material. The gel, however, weakens with increased temperature and under ships motion may cause a leak in the plastic bag material.

The other type of desiccant device is a collector type desiccant device. This type of device contains a desiccant in one container along with a plastic material, such as Tyvek®, and collects the water obtained from the desiccant in a separate container. The collector type desiccant device is complicated, and thus, more costly than the bag type desiccant container. In addition, it has more complexity in its installation and use.

Accordingly, there remains a need for a solution to at least one of the aforementioned problems. For instance, there is an established need for an environmental control device that avoids the leakage problems of the prior art and which is at least as affordable as the conventional bag-type desiccant devices.

SUMMARY OF THE INVENTION

According to an implementation of the present disclosure, there is provided a control device. The control device comprises a plurality of cells, wherein each cell of the plurality of cells comprises a closed base and an open upper end. The control device further comprises a first material placed within an interior lower portion of each cell, a second material placed within an interior upper portion of each cell, a planar support base configured to receive the plurality of cells; and a layer of a third material sealing the open upper end of each cell.

In an aspect, each cell may be surrounded by adjacent cells, wherein each cell may comprise a hexagonal cross-sectional shape, and wherein the plurality of cells may form a honeycomb structure.

In an aspect, each cell may be angled between 50 degrees and 75 degrees relative to the planar support base.

In an aspect, the first material may comprise at least one of a sponge, a water pond filter, and a large particle water filter, and the second material may comprise at least one of a calcium chloride, a powdered iron, and a molecular sieve.

In an aspect, the third material may comprise at least one of: an air permeable membrane; and a water vapor-transmissible and liquid water-impermeable material that comprises a Tyvek material.

In an aspect, the control device may further comprise an extension portion connected to the planar support base, wherein the extension portion may comprise a hanging component configured to suspend the control device with the plurality of cells angled upward.

In an aspect, at least one of the planar support base and the plurality of cells may be made from a polymer selected from polyethylene, polypropylene, and polyethylene terephthalate.

In an aspect, each cell of the plurality of cells may be formed from a plastic sheet using a thermoforming technique.

In an aspect, the lower portion of each cell may comprise three-quarters of a total length of the cell, and the upper portion of each cell may comprise one-quarter of the total length of the cell.

In an aspect, each cell may comprise at least one of: a flat base, a rounded base, and an angled base.

According to another implementation of the present disclosure, there is provided a method of controlling an environment of an enclosed space. The method comprises providing a control device comprising: a plurality of cells, each cell comprises a closed base, an open upper end, a first material in an interior lower portion of each cell, a second material in an interior upper portion of each cell, a planar support base supporting the plurality of cells, and a layer of a third material sealing the open upper end of each cell. The method also comprises placing the control device in the enclosed space, exposing the control device to one or more chemical species present in the environment of the enclosed space, and collecting the one or more chemical species within the control device when the one or more chemical species interact with the control device.

In an aspect, the one or more chemical species may comprise at least one of water vapor, oxygen, and ethylene.

In an aspect, the first material may comprise at least one of a sponge, a water pond filter, and a large particle water filter, and the second material may comprise at least one of a calcium chloride, a powdered iron, and a molecular sieve.

In an aspect, the third material may comprise at least one of: an air permeable membrane; and a water vapor-transmissible and liquid water-impermeable material that comprises a Tyvek material.

In an aspect, the method may further comprise suspending the control device in a vertical orientation using a hanging component attached to the planar support base.

In an aspect, the method may further comprise removing the layer of the third material, the second material, and the first material from the open upper end of each cell after the cell has fully absorbed the one or more chemical species; drying and cleaning the removed first material; refilling each cell with a fresh second material and the dried and cleaned first material; and resealing the open upper end of each cell with a new layer of the third material.

In an aspect, each cell may be angled between 50 degrees and 75 degrees relative to the planar support base during the placement in the enclosed space.

In an aspect, the enclosed space may comprise at least one of a shipping container, a storage room, a bathroom, a basement, a crawl space, and a vehicle interior.

According to yet another implementation of the present disclosure, there is provided a hanging device. The hanging device comprises a series of longitudinal cells, wherein each longitudinal cell comprises a closed base, an open upper end, and an enclosed shaft extending from the closed base to the open upper end, wherein the series of longitudinal cells are connected along exterior surfaces to form a honeycomb formation, and wherein each longitudinal cell is positioned with the closed base secured to a planar support base at an angle from about 50 degrees to about 75 degrees relative to the planar support base. The hanging device also comprises a desiccant in an interior upper portion of the longitudinal cells; a sponge in an interior lower portion of the longitudinal cells; a layer of water vapor-transmissible and liquid water-impermeable material sealing the open upper end of the longitudinal cells; and an extension portion connected to the planar support base, wherein the extension portion comprises a hanging component configured to suspend the hanging device in a vertical orientation with the series of longitudinal cells angled upward.

In an aspect, each longitudinal cell may comprise a hexagonal cross-sectional shape, the series of longitudinal cells may form a 20 by 20 honeycomb array, and the water vapor-transmissible and liquid water-impermeable material may comprise a Tyvek material.

The present invention can be directed to a hanging desiccant device which increases the moisture removal from an enclosed space while using the same amount of desiccant found in conventional hanging desiccant containers and does so in a single chamber device. The hanging desiccant device herein contains a series of longitudinal cells which are arranged in a honeycomb formation, each having a small amount of desiccant positioned in an upper part of the longitudinal cells and a sponge positioned in a lower part. The longitudinal cells are angled by their bases on a support structure, and thus, when the device is turned vertically and hung, the angling of the cells is directed in an upward direction from the ground. This upward angling of the cells avoids having the liquid water which accumulates in each of the cells from contacting a water-vapor transmissible, liquid water-impermeable material which overlays a top of the cells. In addition, the honeycomb structure of the cells increases the strength of the material holding the accumulated water compared to conventional materials.

Conventional bag type devices are cheap but tend to leak and vary in their capabilities depending on temperature and pressure. Collector type desiccant containers are more costly and contain the complexity of two different compartments. Surprisingly, the present invention has discovered that a series longitudinal cells in honeycomb formation, with a small amount of desiccant in each cell and a sponge that is placed in each cell, can use the same overall amount of desiccant present in bag type desiccant devices but can capture a greater volume of liquid water. This is also due to the increased strength of a honeycomb formation compared to a bag-type desiccant device, and also due to the angling of the cells to prevent accumulated water from contacting the covering layer of water-vapor permeable, liquid water-impermeable material which is used in a conventional bag-type desiccant device, which prevents the leaking that typically occurs in conventional bag-type desiccant devices.

The term "about" as used herein can entail a variance of 10% greater or lower than the value recited.

The term "comprising" as used herein also encompasses the terms "consisting essentially of" and "consisting of."

The term "desiccant" as use herein can comprises any material, component, substance, composition that is capable of absorbing more than its weight in water from the surrounding environment in an enclosed space, e.g., from a shipping container or a portion thereof, e.g., at least $\frac{1}{10}$ of the space therein.

The term "hanging" as used herein is understood to mean that the device can be suspended at a position above the ground or floor level, preferably at a position at least about 6 feet, more preferably at least 8 feet from the ground or floor level and can be suspended using any known or conventional means for hanging an object.

The values of any endpoint(s) of any range(s) recited herein can be used to create different ranges or different endpoints of ranges to those described herein. The endpoints in any of the ranges described herein can also include any integer value in the recited range even if not expressly described. Thus, for example, a range of from 1.0 to 10 can include as alternate range endpoints any integer between 1 and 10, such as, the non-limiting integer examples of 2, 3, 4, 5, 6, 7, 8 and 9.

In a first implementation of the invention there can be provided a hanging desiccant device comprising;

a series of longitudinal cells each having a closed base, an open upper end, and an enclosed shaft between the open upper end and the closed base, which longitudinal cells are connected to each other by exterior surfaces thereof in a honeycomb formation, and which are each situated by their closed bases on a planar support base at an angle of from about 50 degrees up to about 75 degrees to the planar support base; the quantity of cells may vary from 1 to 400 depending on the application, the angle may vary from 0 to ±45 degrees;

a desiccant in an interior upper portion of the longitudinal cells;

a layer of water vapor-transmissible and liquid water-impermeable material sealing the open upper end of the longitudinal cells;

each cell comprises a sponge in an interior lower portion; and, an extension portion contiguous with the planar support base which contains no cells supported thereon, and which extension portion is configurable with a hanging component for the hanging of the desiccant device such that the cells are angled upwards when the desiccant device is hung.

In one aspect of the invention, the series of longitudinal cells can vary in number and orientation depending on the size of the enclosed space desired to be treated by the desiccant device. Preferably the series of longitudinal cells can comprise a circular, oval, triangle, square or a rectangular shape, of from about 5 by 5 cells arranged in a square up to about 30 by 30 cells arranged in a square, more preferably from about 15 by 15 cells arranged in a square up to about 25 by 25 cells arranged in a square, most preferably about 20 by 20 cells arranged in a square pattern.

In another aspect of the invention, the series of longitudinal cells can be made of any suitable polymer material, e.g., such as but not limited to any one or more of polyethylene, polypropylene, copolymers of polyethylene and polypropylene, polyethylene terephthalate, polyvinyl chloride, styrene, acrylonitrile butadiene styrene, acrylonitrile, polycarbonate, and the like.

In another aspect of the invention, the longitudinal cells can have a polygonal shape along its longitudinal length, such as, but not limited to tubular, triangular, square, rectangular, pentagonal, hexagonal, heptagonal, and octagonal, more preferably hexagonal. In a preferred embodiment each of the longitudinal cells are attached by the entire length of the exterior polygonal shapes of the cells to each other such that when viewing the cells along their open upper ends, the mass of connected cells has a honeycomb cell appearance.

In yet another aspect of the invention, the longitudinal cells can have a flat base, rounded base, or angled base. Preferably the base is angled to the same angle as described herein for the angle of the cell to the planar support base.

In yet even another aspect of the invention, the longitudinal cells can have a length of from about 3 inches up to about 8 inches, more preferably about 5-6 inches. Preferably the longitudinal cells can contain from about 40 milliliters (ml) up to about 100 ml, preferably from about 45 ml up to about 80 ml, most preferably from about 50 ml up to about 75 ml.

In yet another aspect of the invention, the desiccant is in the absence of a gelling agent.

In yet one other aspect of the invention, the desiccant device can be used in a bathroom, a crawl space, a recreational vehicle, a boat, a basement, and other similar places that are subject to undesirable levels of moisture, e.g., any level of moisture that results in mold in such an enclosed space over a period of at least 1 day up to about 3 months.

In yet even one other aspect of the invention, the open upper end can have the same shape as the longitudinal cell.

In yet still one other aspect of the invention, the longitudinal cells are each situated by their closed base, e.g., an angled base, on a planar support base at an angle of from about 55 degrees up to about 70 degrees, more preferably from about 60 to about 70 degrees.

In yet still even another aspect of the invention, the planar support base can be a rigid or flexible material, preferably a rigid material, such as polymer material such as any of the polymer materials described herein for the material of the longitudinal cells. The planar support base can be of any suitable thickness but preferably can be from about $\frac{1}{16}$ of an inch thick up to about $\frac{1}{2}$ of an inch thick, preferably about $\frac{1}{4}$ of an inch thick.

In another aspect of the invention, the longitudinal cells can be situated by their closed bases on the planar support base by any suitable method, such as, but not limited to adhesive, thermos-welding, extrusion, and the like.

In yet another aspect of the invention, the desiccant can be situated in the interior upper portion of the cells, i.e., in the upper 0.5 inches to 2 inches of the longitudinal cell, i.e., 0.5 inches up to 2 inches from the open upper end of the longitudinal cell. The desiccant can be secured in the upper portion by any underlying support layer such as but not limited to a screen, mesh, vapor permeable cloth, apertured polymer disk, and the like. Preferably the underlying support layer does not have openings therein which are larger than the diameter of the desiccant material, such that the desiccant material is retained in the upper portion of the cells.

In yet still another aspect of the invention, the desiccant can be selected from a wide variety of suitable materials including desiccant materials well known to those skilled in the art such as silica gel (silicon dioxide; $SiO_2$) and activated charcoal, and other hygroscopic substances including calcium chloride ($CaCl_2$), calcium sulphate ($CaSO_4$), porous glass, and various clay and zeolite materials. Such materials, including the examples of calcium chloride and calcium sulphate, are preferably provided in a dry form (i.e., without any free moisture). Also, such materials are preferably provided in a particulate (e.g. fine powder) or granular form providing a high specific surface area (SSA) of, for example, $>100$ m$^2$g$^{-1}$, or more preferably $>200$ m$^2$g$^{-1}$, and may preferably be characterized by a loose bulk density of, for example, $>0.2$ g/cm$^3$, more preferably $>0.28$ g/cm$^3$.

Preferably every cell in the device can contain a small amount of desiccant, only enough desiccant that can provide for a water level which is less than the total volume of the cell, preferably only enough that can provide for a water level which is less than 75% of the volume of the cell, preferably less than 60% of the volume of the cell. Preferably, the device of the present invention can contain from about 2 kg to about 4 kg, preferably about 3 kg dispersed equivalently among the cells of the device. More preferably the device contains 3 kg dispersed equivalently amount 400 cells of the device, such that each cell contains from about 5 grams up to about 10 grams per cell, preferably from about 7 to about 8 grams per cell, and most preferably about 7.5 grams per cell.

In another aspect of the invention, the desiccant may be provided in combination with a solid substrate providing a high specific surface area (SSA) of, for example, $>100$ m$^2$g$^{-1}$, more preferably $>200$ m$^2$ g$^{-1}$. Suitable examples of such a substrate include precipitated silica, polymeric films, or polymeric fibers (optionally provided as a woven or non-woven mesh or fabric such as 3M absorbent cloth (Scotch-Brite® kitchen cloth); 3M Corporation, St Paul, Minn., United States of America), and other materials such as natural vermiculite and molecular sieves. In some particular embodiments, the substrate may be silica gel, in which case the desiccant ability of the substrate may complement the moisture-removing capacity of the desiccant. The desiccant and the substrate may be provided as a composition comprising each of said moisture-removing material and substrate in, for example, a simple admixture or, alternatively, as a coating (preferably, a partial coating) of one on the other. One particular example of this latter arrangement consists of a substrate comprising a polymeric film or polymeric fibers (optionally provided as a woven or non-woven mesh or fabric) coated or partially coated with the desiccant. Another particular example consists of a particulate or granular substrate (e.g., silica gel) wherein the particles/granules are coated or partially coated with the desiccant.

In another aspect of the invention, the layer of water vapor-transmissible and liquid water-impermeable material sealing the open upper ends of the longitudinal cells (i.e., the sealing material) can be applied as a sheet material. Preferably, sealing material can be a single layer microporous film formed from a polyolefinic material, such as polyethylene, polypropylene, poly(fluorinated ethylene), ethylene vinyl acetate, ethylene acrylic ester and the like. The sealing material film may be any of the commercially available films which are sold, for example, under the name Celgard® (Hoechst Celanese Corporation), GORE-TEX® (Gore & Co. GmbH) and Tyvek® (E.I. DuPont). The preferred microporous film has a Gurley-type air permeability of about 0.01 to 10,000 sec./100 millimeters, preferably 1 to 1,000 second/100 millimeters and most preferably less than about 400 seconds/100 millimeters. Preferably, the microporous film is a polyethylene or polypropylene-based microporous film and most preferably a polyethylene spun-bonded paper such as Tyvek® 1059B or 1037B manufactured by E.I. DuPont, or a polypropylene based film, such as GDT II manufactured by San Ai, Ltd. of Osaka, Japan. Most preferably, the sealing material can be a sheet of spun bonded polyethylene such as a non-woven HDPE fiber such as Tyvek® (Dupont Corporation, Wilmington, Del., United States of America) or other porous material such as expanded PTFE and cellulose, but as noted, preferably the sealing material is a flash-spun and heat-bonded high-density polyethylene (HDPE) fabric that is sold under the tradename TYVEK. In one aspect, the sealing material can be removable from the open upper end by peeling it off when desired.

In another aspect of the invention, the extension portion can be a contiguous extension of the same or different material used as the support base material, but which contains no cells supported thereon. The extension portion can be configurable with a hanging component such as a fastener (e.g., screw, nail, bolt, rivet etc.), or carabiner, or can have an attached hook affixed thereto by various known methods know in the art, such as the non-limiting example of a clothing-hangar shaped hook that has a longitudinal lower part running along an edge of the extension portion and a centrally located hook molded there along and arising therefrom. Alternatively, an edge of the extension portion can have holes there along for use with a fastener or other hanging type device, i.e., the holes may be what is configurable with a hanging component such as a fastener. In some embodiments, several fasteners can be employed with one or more in each of several holes along the edge of the extension section. Preferably such holes can be reinforced with suitable polymer layers or materials, such as metal rings, which provide for sufficient strength for the device to be held there along when suspended in its intended operative condition.

It can be understood herein that when the desiccant device is laid on a planar surface by its planar support base, the longitudinal cells will be angled all in one specific direction in the aforementioned angle with the extension portion emanating from the side of the planar surface which is the same side as the direction of the angled longitudinal cells. Thus, when the device is lifted from the planar surface and hung by the extension portion with a hanging component, the cells will all be directed in an upwards direction opposite the ground and/or floor.

It will also be understood that when the device is in operation and water is absorbed by the desiccant in the upper portion of the cell by having water vapor transmit through the sealing material of the device, the water vapor will condensate inside the longitudinal cell and through gravity will eventually drip down into the lower part of the longitudinal cell at the base of the cells. Preferably, each cell can absorb about 3 to about 4 times the amount of water as the amount of desiccant in the cell. Preferably, based on the noted amounts of desiccant, each longitudinal cell can absorb from about 20 ml up to about 50 ml of water, more preferably from about 25 ml to about 35 ml and most preferably about 30 ml of liquid water in each cell. Such amounts can accumulate depending on the temperature and humidity of the environment where the device is placed but generally can accumulate such amount of water in each cell over a period of from about 3 days to about 4 months, preferably from about 4 days to 3 months.

In view of the fact that the longitudinal cells are angled along the planar base the device can provide for the amount of water collected in the device will not contact the sealing material on top of the cells, and as such, the sealing material is not compromised by the water in the cells.

In a second implementation of the invention there can be provided herein a method of removing moisture from an enclosed space comprising;

providing a desiccant device which comprises:

a series of longitudinal cells each having a closed base, an open upper end, and an enclosed shaft the closed base and the open upper end, which longitudinal cells are connected to each other by exterior surfaces thereof in a honeycomb formation, and which are each situated by their closed bases on a planar support base at an angle of from about 50 degrees up to about 75 degrees to the planar support base;

a desiccant in an interior upper portion of the longitudinal cells;

a sponge in an interior lower portion of the longitudinal cells;

a layer of water vapor-transmissible and liquid water-impermeable material sealing the open upper end of the longitudinal cells; and, an extension portion contiguous with the planar support base which contains no cells supported thereon, and which extension portion is configurable with a hanging component for the hanging of the desiccant device such that the cells are angled upwards when the desiccant device is hung; and, placing the desiccant device into an enclosed space.

In one aspect of the invention, the after the desiccant device has reached its operative value, i.e., the longitudinal cells are full of water, the device can be recycled. The device can be recycled by peeling back the sealing material, e.g., the Tyvek material, and tilting the cells to remove the used desiccant material and the accumulated water in the sponge into a suitable location, e.g., a drain, washing the sponge in clean water, and then inserting fresh desiccant material into the longitudinal cells and resealing the open upper ends of the cells with a new layer of sealing material.

In another aspect of the invention, the device can be used in shipping containers or in household locations such as bathrooms and basements.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 6 is a flow chart of the steps of one possible method of the invention herein.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
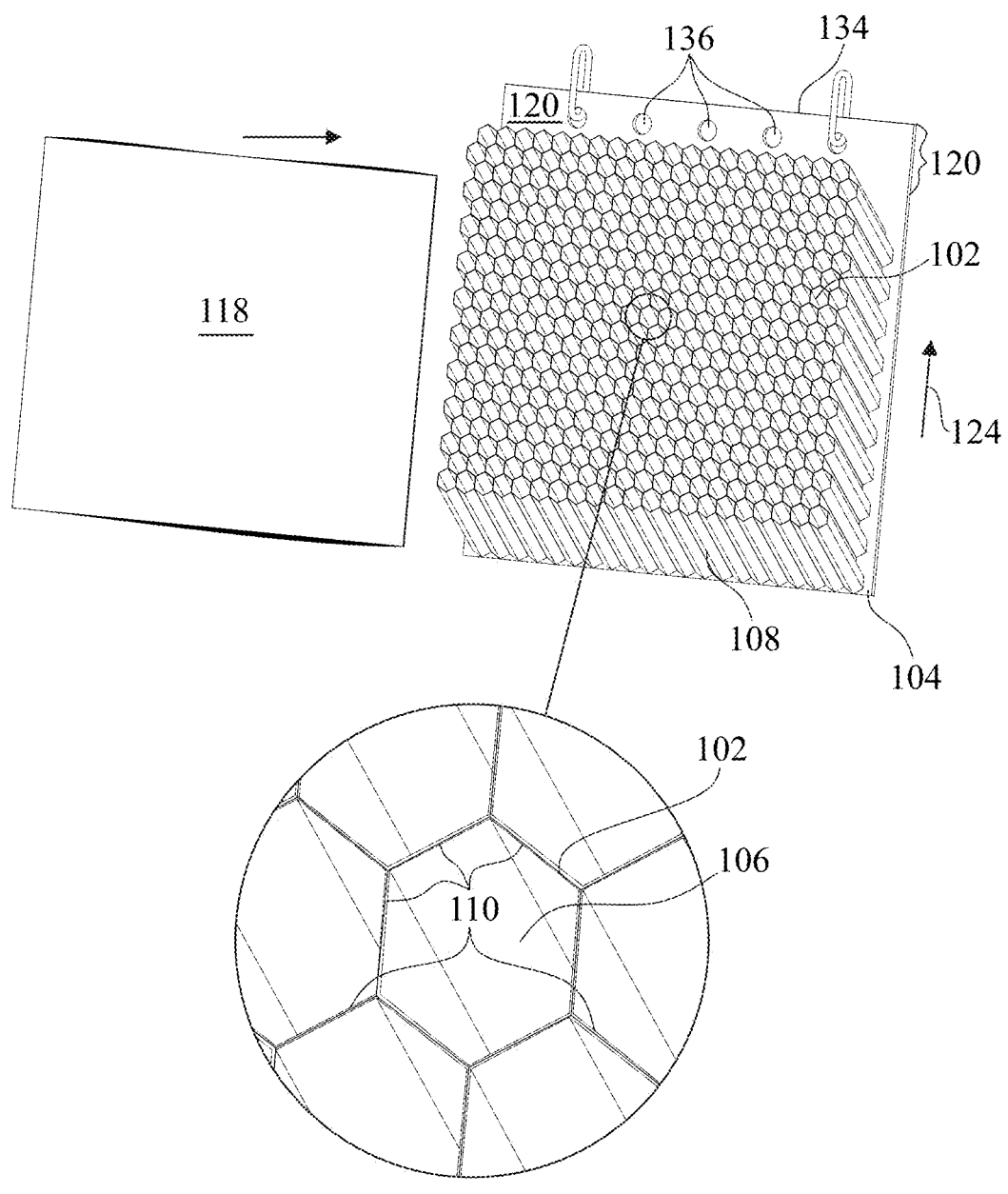
FIG. 1 is a view of the hanging device of the invention and an enlarged view of the honeycomb formation of cells.
Figure 2:
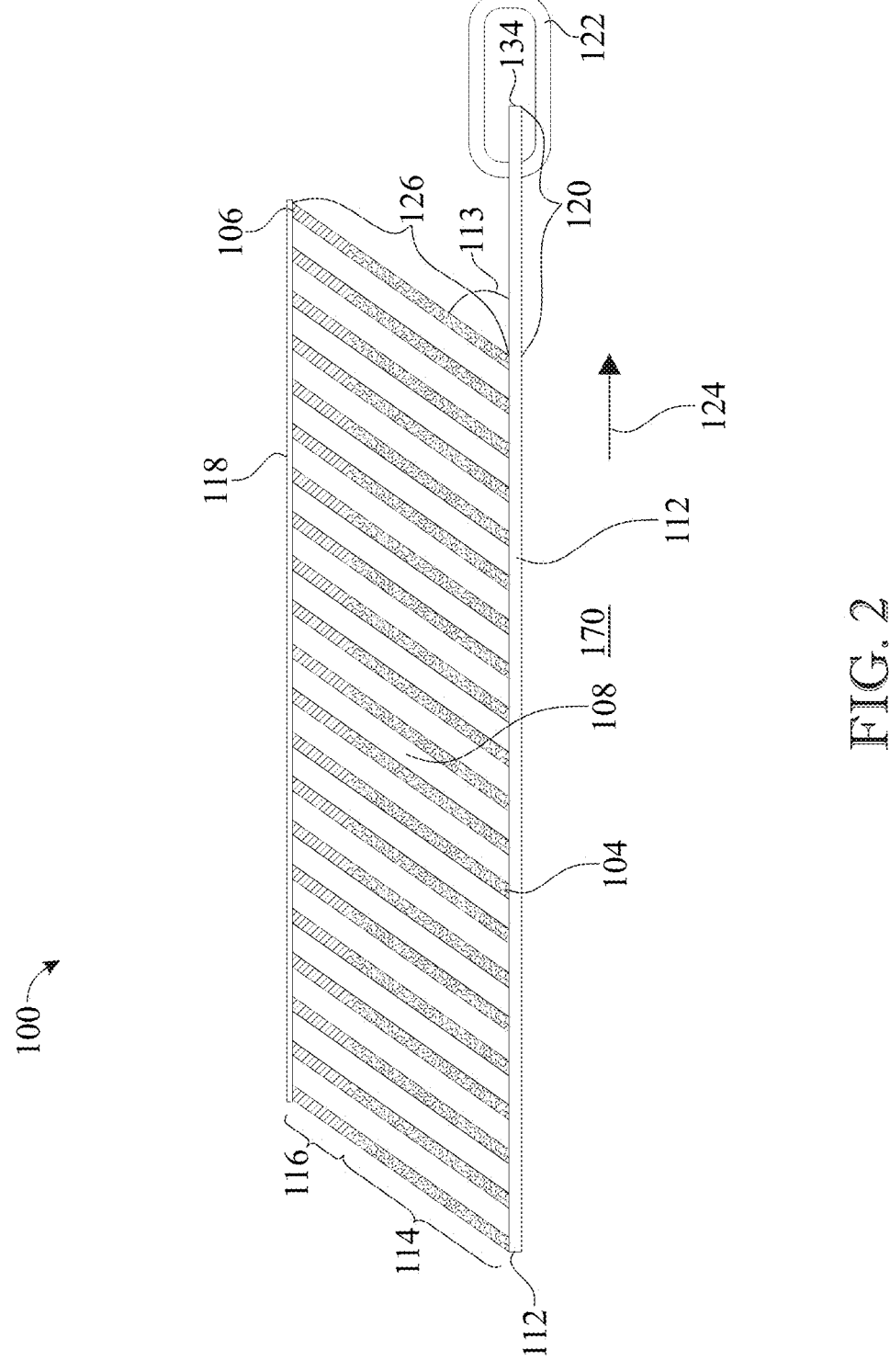
FIG. 2 is a side view of the hanging device of FIG. 1.
Figure 3:
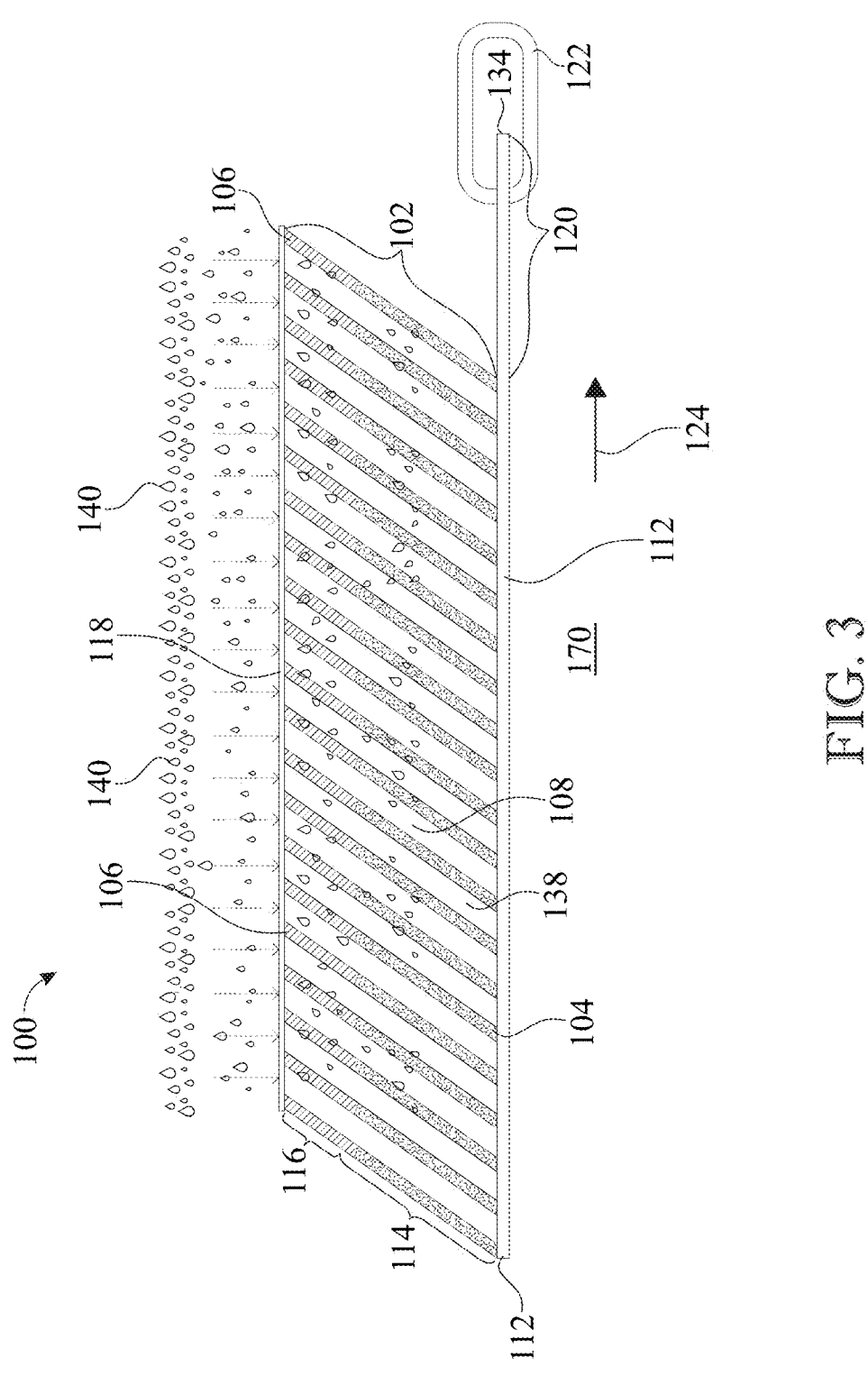
FIG. 3 is a side view of the hanging device of FIG. 1 showing the accumulation of water in the cells of the device.
Figure 4A:
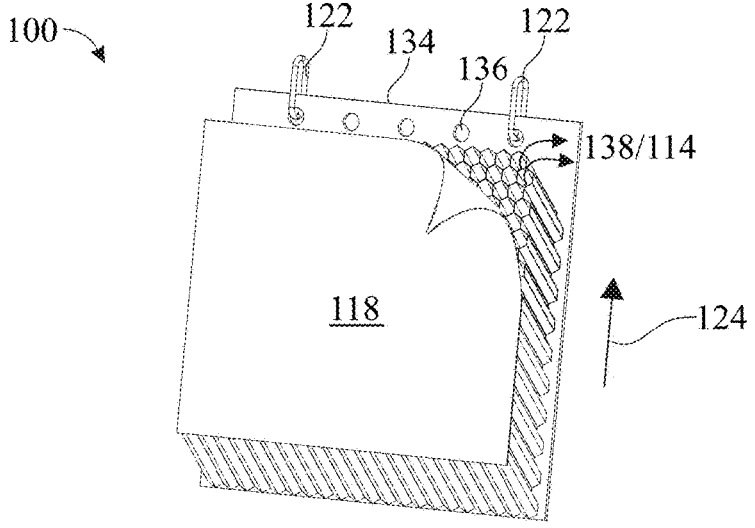
FIG. 4A is top view of the hanging device of FIG. 1, showing the peeling away of the layer of a third material to permit accumulated chemical species to be removed from the cells.
Figure 4B:
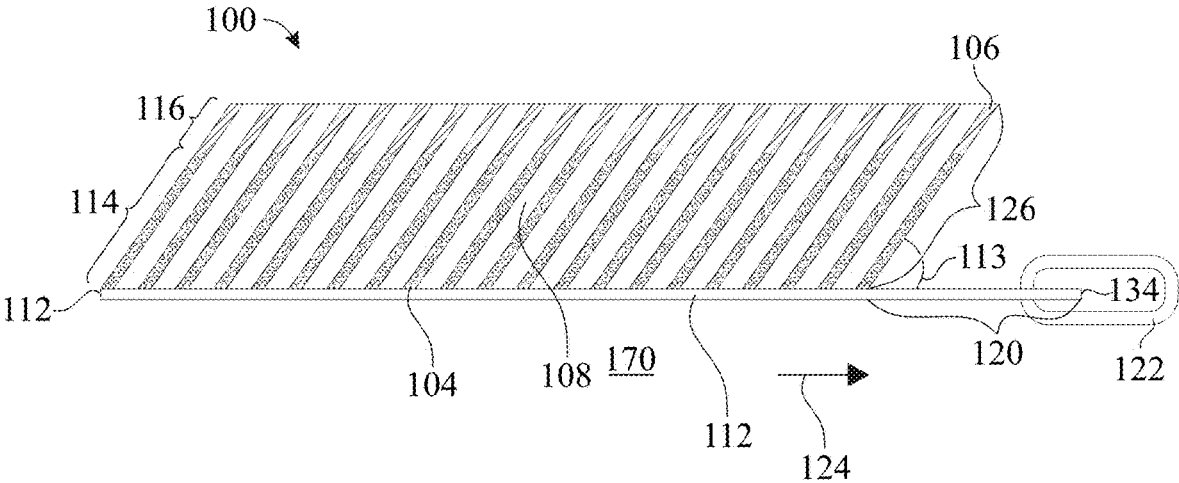
FIG. 4B is a side view of the hanging device of FIG. 4A showing the addition of fresh materials into the cells and showing chemical species being removed from the cells.

Referring initially to FIGS. 1-3 there is provided a hanging device 100 (also known as an environmental control device 100 or a control device 100 or a device 100). The device 100 contains a series of longitudinal cells each 102 having a closed base 104, an open upper end 106, and an enclosed shaft 108 therebetween, which longitudinal cells 102 are connected to each other by exterior surfaces 110 thereof in a honeycomb formation, and which are each situated by their closed bases 104 on a planar support base 112 at an angle 113 of from about 50 degrees up to about 75 degrees to the planar support base 112. In some embodiments, the angle 113 may vary between −45 degrees and 45 degrees.

The device 100 also contains a first material in an interior lower portion 114 and a second material (such as desiccant) in an interior upper portion 116 of the longitudinal cells 102 which is sealed by a layer of a third material 118 sealing the open upper end 106 of the longitudinal cells 102. In some embodiments, the interior lower portion is three-quarters of the total length of the longitudinal cell 102, and the interior upper portion is one-quarter of the total length of the longitudinal cell 102.

In some embodiments, the first material may be one of a sponge, a water pond filter, and a large particle water filter and the second material may be one of a calcium chloride, a powder iron, and a molecular sieve. Further, in some embodiments, the third material 118 may be a water vapor-transmissible and liquid water-impermeable material that comprises a Tyvek material. In some other embodiments, the third material 118 may be an air permeable membrane.

In some embodiments, when the first material is the sponge, the second material is the calcium chloride, and the third material is the water vapor-transmissible and liquid water-impermeable material, the environmental control device 100 is known as the desiccant device.

In some other embodiments, when the first material is the water pond filter, the second material is the powder iron, and the third material is the air permeable membrane, the environmental control device 100 is known as an oxygen absorber device.

In some yet other embodiments, when the first material is the large particle water filter, the second material is the molecular sieve, and the third material is the air permeable membrane, the environmental control device 100 is known as an ethylene absorber device.

The device 100 also contains an extension portion 120 contiguous with the planar support base 112 which contains no cells 102 supported thereon, and which extension portion 120 is configurable with a hanging component 122 for the hanging of the desiccant device 100 such that the cells 102 are angled upwards when the desiccant device 100 is hung.

Referring to FIGS. 1-5, each of the longitudinal cells 102 are attached by the entire length of the exterior polygonal shapes of the cells 102 to each other such that when viewing the cells along their open upper ends 106, the mass of connected cells 102 has a honeycomb cell appearance (see enlarged view in FIG. 1).

In yet another aspect of the invention, the longitudinal cells 102 have an angled base 104, which the base 104 has the same angle 113 as described herein for the angle 113 of the cell 102 to the planar support base 112.

In yet even another aspect of the invention, the longitudinal cells 102 can have a length 126.

Figure 5A:
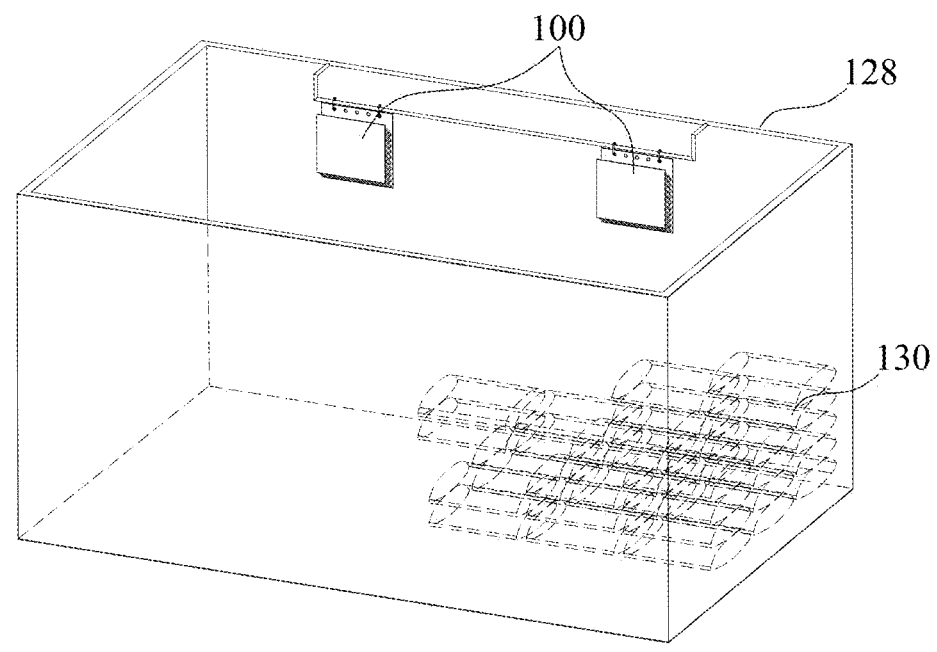
FIG. 5A shows the placement of the hanging device in an elevated position in a shipping container.
Figure 5B:
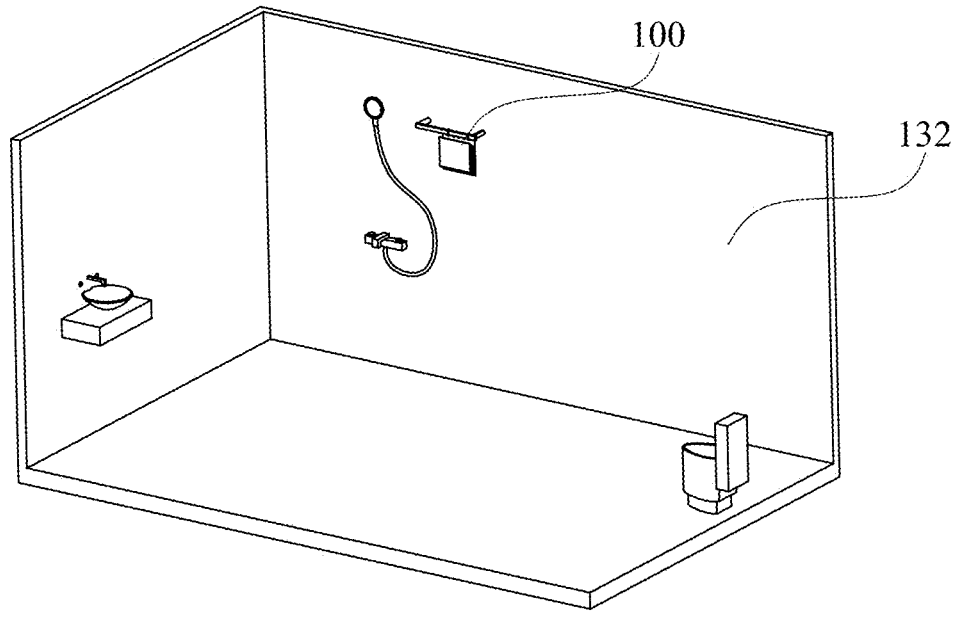
FIG. 5B shows the placement of the hanging device in an elevated position in a household bathroom.

Referring now to FIG. 5A, the device 100 can be used in a shipping container 128 to protect foodstuffs 130. Referring to FIG. 5B, the device 100 can be used in a bathroom 132.

In yet even one other aspect of the invention, the open upper end 106 can have the same shape as the longitudinal cell 102.

Referring now to FIGS. 2, 3, 4A and 4B, the first material can be situated in the interior upper portion 116 of the cells 102. In another aspect of the invention, the layer of the third material 118 sealing the open upper ends 106 of the longitudinal cells 102 (i.e., the sealing material) can be applied as a sheet material 118. In one aspect, the sealing material 118 can be removable from the open upper end 106 by peeling it off when desired; see in this regard FIG. 4A.

In another aspect of the invention, the extension portion 120 can be configurable with a hanging component 122 such as a carabineer 122. Alternatively, an edge 134 of the extension portion 118 can have holes 136 there along for use with a carabineer 122, i.e., the holes 136 may be what is configurable with a hanging component such as a carabineer 122.

Referring now to FIGS. 2 and 3, it can be understood herein that when the desiccant device 100 is laid on a planar surface 170 by its planar support base 112, the longitudinal cells 102 will be angled all in one specific direction 124 in the aforementioned angle with the extension portion 120 emanating from the side of the planar support base 112 which is the same side as the direction 124 of the angled longitudinal cells 102. Thus, when the device 100 is lifted from the planar surface 170 and hung by the extension portion 120 with a hanging component 122, the cells 102 will all be directed in an upwards direction 124 opposite the ground and/or floor (not shown).

Referring more specifically to FIG. 3, it will also be understood that when the device 100 is in operation and one or more chemical species (such as water 138, oxygen, and ethylene) is absorbed from the surrounding area by the second material (such as desiccant) in the upper portion 116 of the cell 102 by having water vapor 140 transmit through the sealing material 118 of the device 100, the water vapor 140 will condensate inside the longitudinal cell 102 and through gravity will eventually drip down into the lower part 114 of the longitudinal cell 102 at the base 104 of the cells 102. In some other embodiments, the water vapor 140 will be absorbed by the first material (such as a sponge). In view of the fact that the longitudinal cells 102 are angled 113 along the planar base 112, the device 100 can provide for that the amount of water 138 collected in the device 100 will not contact the sealing material 118 on top 106 of the cells 102, and as such, the sealing material 118 is not compromised by the water 138 in the cells 102.

Referring again to FIGS. 4A and 4B after the device 100 has reached its operative value, i.e., the longitudinal cells are full of chemical species (water 138), the device 100 can be recycled. The device 100 can be recycled by peeling back the sealing material 118 and the cells 102 can be tiled to remove the used the first and second materials and the accumulated chemical species (water 138) into a suitable location, then dry and clean the first material, and fresh first and second materials can be inserted into the longitudinal cells 102 and the open upper ends 106 of the cells 102 can be resealed with a new layer of sealing material 118.

Referring now to FIG. 6, there can be provided a method comprising the step 144 extruding the tubes (also known as cells) 102 in a 20×20 formation and cutting the tops 106 off at a 45 degree angle. In some embodiments, the plurality of cells 102 are formed from a plastic sheet using a thermo-forming technique. The next step 146 can be placing the cut tubes 102 on a support base 112 at a 45 degree angle. The next step 146 can also comprise placing and/or inserting the first material (such as a sponge, a water pond filter, and a large particle water filter) in each tube.

The next step 148 can comprise placing and/or inserting the second material (such as a calcium chloride, a powder iron, and a molecular sieve) above the first material in each tube. In some embodiments, the step 148 may comprise taking 3 Kg of calcium chloride desiccant and distributing it equally among the 400 cells 102. The next step 150 can comprise sealing the tops 106 of the tubes 102 with a sheet of third material (sealing material 118), such as Tyvek® and an air permeable membrane. The next step 160 can comprise hanging the device 100 in a shipping container 128 containing moisture sensitive products 130. The next step 162 can comprise shipping the products 130 through tropical time zones. The next step 164 can comprise removing the third material 118, the accumulated chemical species and used second material from the tubes 102, drying and cleaning the first material, and refilling the tubes with fresh second material, dried first material, and covering them with sealing material 118.

Figure 7:
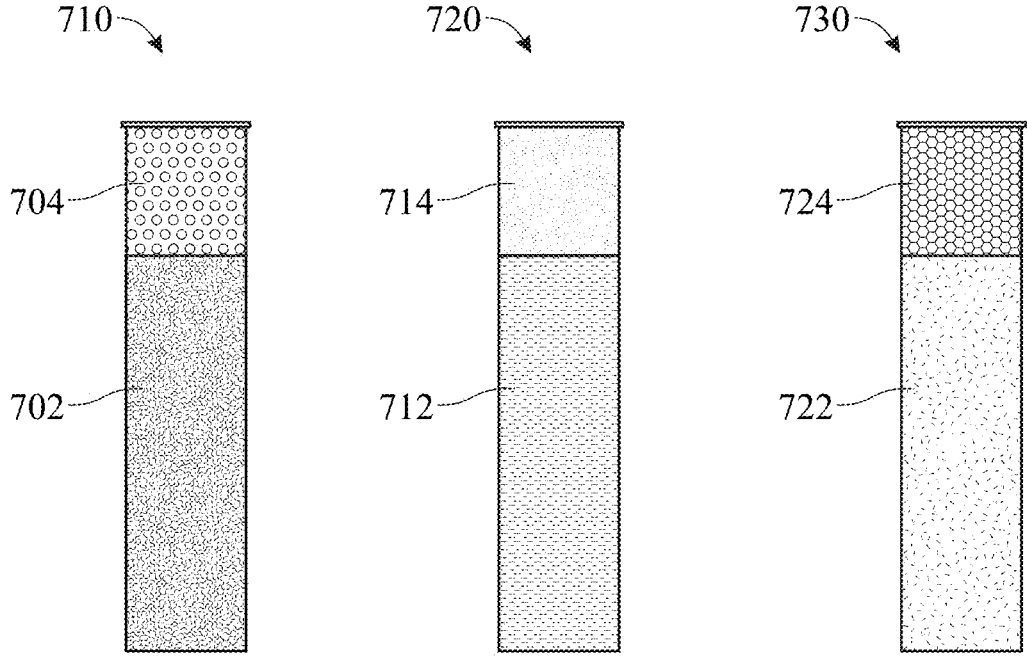
FIG. 7 shows a comparative view of three types of environmental control cells.

Referring now to FIG. 7, there is shown a comparative view of three types of environmental control cells, specifically a descent cell 710, an oxygen absorber cell 720, and an ethylene absorber cell 730. Each of the cells 710, 720, and 730 is formed as a longitudinal cell structure similar to the cells 102 described with reference to FIGS. 1-6, having a closed base, an open upper end, and an enclosed shaft between the closed base and the open upper end.

The descent cell 710 includes a first material, such as a sponge 702, situated in a lower interior portion, and a second material, such as calcium chloride 704, situated in an upper interior portion. The open upper end of the descent cell 710 is sealed with a third material, such as a water vapor-transmissible and liquid water-impermeable sheet (e.g., Tyvek®). This configuration allows the descent cell 710 to absorb moisture from the surrounding air.

The oxygen absorber cell 720 includes a water pond filter 712 in the lower interior portion and powder iron 714 in the upper interior portion. The open upper end of cell 720 is sealed with an air permeable membrane, allowing oxygen to enter and react with the powder iron to be absorbed, thus reducing oxygen levels in the surrounding environment.

The ethylene absorber cell 730 includes a large particle water filter 722 in the lower interior portion and a molecular sieve 724 in the upper interior portion. The open upper end of the ethylene absorber cell 730 is also sealed with an air permeable membrane, allowing ethylene gas to pass through and be absorbed by the molecular sieve.

Each of the cells 710, 720, and 730 may be incorporated into an environmental control device 100, or used individually, depending on the specific atmospheric control needs for a given application, such as in food storage or transport.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A control device, comprising:
a plurality of cells, wherein each cell of the plurality of cells comprises a closed base and an open upper end, wherein each cell is surrounded by adjacent cells, wherein each cell comprises a hexagonal cross-sectional shape, and wherein the plurality of cells form a honeycomb structure;
a first material placed within an interior lower portion of each cell;
a second material placed within an interior upper portion of each cell;
a planar support base configured to receive the plurality of cells; and
a layer of a third material sealing the open upper end of each cell,
wherein the first material comprises at least one of a sponge, a water pond filter, and a large particle water filter,
wherein the second material comprises at least one of a calcium chloride, a powdered iron, and a molecular sieve, and
wherein the third material comprises at least one of: an air permeable membrane, and a water vapor-transmissible and liquid water-impermeable material that comprises a Tyvek material.

2. The control device of claim 1, wherein each cell is angled between 50 degrees and 75 degrees relative to the planar support base.

3. The control device of claim 1, further comprises:
an extension portion connected to the planar support base, wherein the extension portion comprises a hanging component configured to suspend the control device with the plurality of cells angled upward.

4. The control device of claim 1, wherein at least one of the planar support base and the plurality of cells are made from a polymer selected from polyethylene, polypropylene, and polyethylene terephthalate.

5. The control device of claim 1, wherein each cell of the plurality of cells is formed from a plastic sheet using a thermoforming technique.

6. The control device of claim 1, wherein the lower portion of each cell comprises three-quarters of a total length of the cell, and the upper portion of each cell comprises one-quarter of the total length of the cell.

7. The control device of claim 1, wherein each cell comprises at least one of: a flat base, a rounded base, and an angled base.

8. A method of controlling an environment of an enclosed space, comprising:
providing a control device comprising:
a plurality of cells, each cell comprises a closed base, an open upper end, a first material in an interior lower portion of each cell, a second material in an interior upper portion of each cell, a planar support base supporting the plurality of cells, and a layer of a third material sealing the open upper end of each cell, wherein each cell is surrounded by adjacent cells, wherein each cell comprises a hexagonal cross-sectional shape, and wherein the plurality of cells form a honeycomb structure, wherein the first material comprises at least one of a sponge, a water pond filter, and a large particle water filter, wherein the second material comprises at least one of a calcium chloride, a powdered iron, and a molecular sieve, and wherein the third material comprises at least one of: an air permeable membrane, and a water vapor-transmissible and liquid water-impermeable material that comprises a Tyvek material;
placing the control device in the enclosed space;
exposing the control device to one or more chemical species present in the environment of the enclosed space; and
collecting the one or more chemical species within the control device when the one or more chemical species interact with the control device.

9. The method of claim 8, wherein the one or more chemical species comprises at least one of water vapor, oxygen, and ethylene.

10. The method of claim 8, further comprising:
suspending the control device in a vertical orientation using a hanging component attached to the planar support base.

11. The method of claim 8, further comprising:
removing the layer of the third material, the second material, and the first material from the open upper end of each cell after the cell has fully absorbed the one or more chemical species;
drying and cleaning the removed first material;
refilling each cell with a fresh second material and the dried and cleaned first material; and
resealing the open upper end of each cell with a new layer of the third material.

12. The method of claim 8, wherein each cell is angled between 50 degrees and 75 degrees relative to the planar support base during the placement in the enclosed space.

13. The method of claim 8, wherein the enclosed space comprises at least one of a shipping container, a storage room, a bathroom, a basement, a crawl space, and a vehicle interior.

14. A hanging device, comprising;
a series of longitudinal cells, wherein each longitudinal cell comprises a closed base, an open upper end, and an enclosed shaft extending from the closed base to the open upper end, wherein each cell of the serious of longitudinal cells comprises a hexagonal cross-sectional shape, wherein the series of longitudinal cells are connected along exterior surfaces to form a honeycomb formation, and wherein each longitudinal cell is positioned with the closed base secured to a planar support base at an angle from about 50 degrees to about 75 degrees relative to the planar support base;

a first material placed within an interior lower portion of each cell;

a second material placed within an interior upper portion of each cell;

a layer of a third material sealing the open upper end of each cell; and an extension portion connected to the planar support base, wherein the extension portion comprises a hanging component configured to suspend the hanging device in a vertical orientation with the series of longitudinal cells angled upward;

wherein the first material comprises at least one of a sponge, a water pond filter, and a large particle water filter, wherein the second material comprises at least one of a calcium chloride, a powdered iron, and a molecular sieve, and wherein the third material comprises at least one of: an air permeable membrane, and a water vapor-transmissible and liquid water-impermeable material that comprises a Tyvek material.

* * * * *